Patented Aug. 10, 1926.

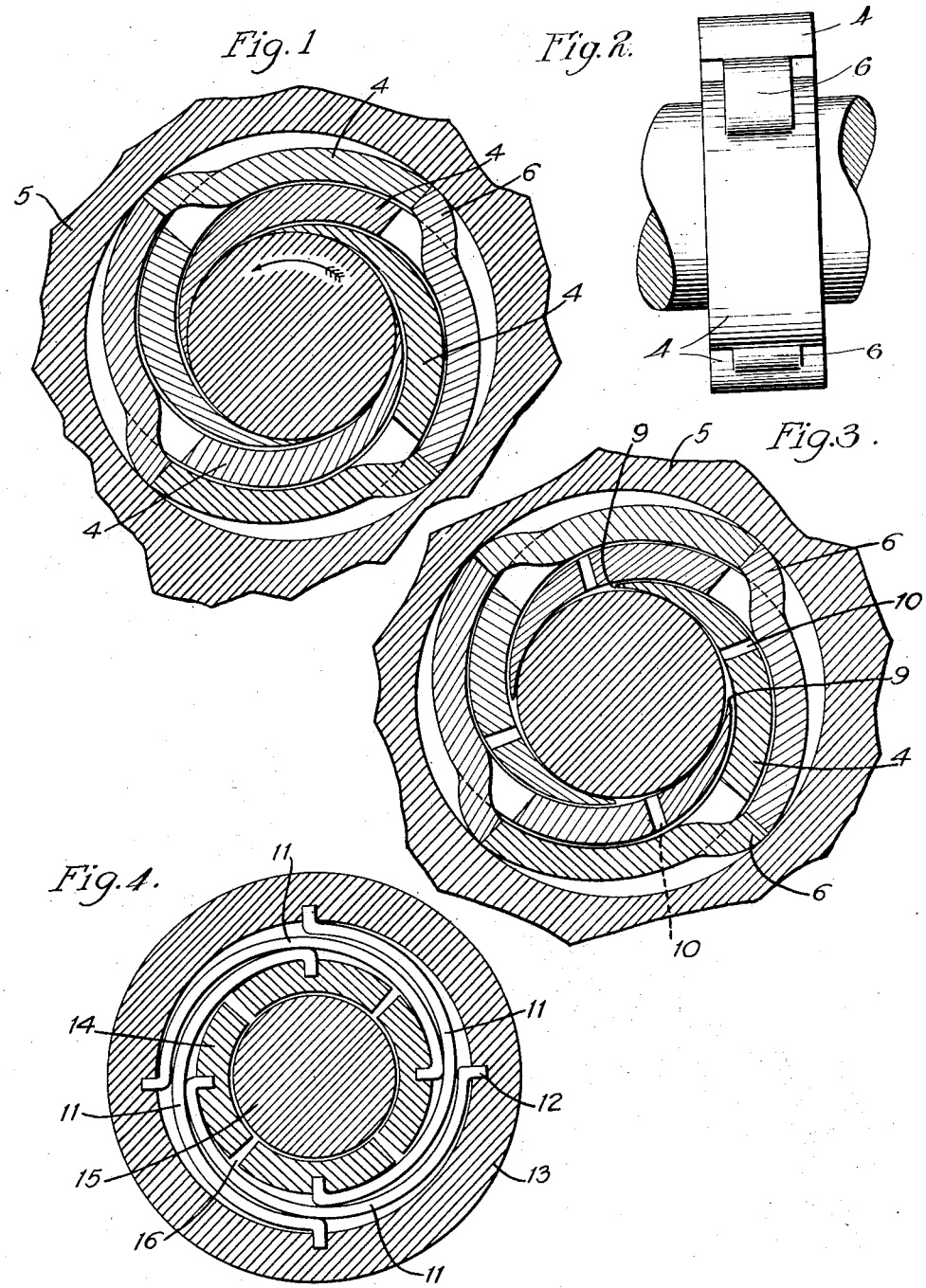

1,595,744

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE BEARING.

Application filed September 8, 1924. Serial No. 736,457.

My invention relates to bearings and it has particular relation to flexible bearings for supporting small high-speed motors.

In small high-speed motors, and particularly in vacuum-cleaner motors, it is very difficult to obtain a sufficiently accurate balance for quiet operation. In the case of vacuum-cleaner motors, the shaft extension usually carries the rotor of a blower. The blower wheel catches dirt which sticks for awhile and is afterwards thrown off. For this reason, no permanent balance can be maintained.

To allow the rotor to rotate around its own center of gravity, within the limit of clearances available, a flexible support for the shaft is required.

The object of my invention is to provide a flexible bearing which is particularly adapted to the above-mentioned applications, although by no means limited thereto, and which will be self lubricating and free from critical-speed limitations.

With the foregoing and other objects in view, my invention consists in the constructions hereinafter described and illustrated in the accompanying drawing, wherein Fig. 1 is a sectional view of a journal bearing embodying my invention in a preferred form; only one of the springs being shown in section, Fig. 2 is a longitudinal view of the nested springs removed from the housing, and Figs. 3 and 4 are sectional views similar to Fig. 1, illustrating modifications.

Referring to Fig. 1, my invention consists of a plurality of concentric segmental spiral leaf springs 4, the leaves of which are separated by capillary spaces for holding lubricant. The outer ends of the springs are mounted in an outer bushing or housing 5, in any desired manner, the preferred construction comprising lugs 6 struck out from intermediate portions of the several springs to seat against the outer bushing and to provide a two-point support for the springs. Each lug 6 may also abut against the outer end of the next adjacent spring to maintain the entire set of springs in position.

In assembling my bearing, the springs 4 are forced within the outer bushing 5 under compression, so that they are held firmly in place, the inner ends of the springs are then turned on a lathe, or preferably reamed, in order to taper the said ends off into a substantially circular shape for engagement with the shaft. The reamer applies a considerable pressure against the springs and forces them back until they are pressed one against the other. The reamer, therefore, must be of oversize, so that when the pressure is released they deflect toward the center and enclose the shaft with a slight pressure. Because of the oversize of the reamer, each spring is in contact with the shaft only along a line parallel to the shaft axis and forms a wedge space in both directions away from this contact line. In this form of my invention, the shaft always rotates in the same direction, as indicated by the arrow.

In case of misalignment, my bearing will give to a certain extent like a bearing supported on a ball surface.

In the form of my invention illustrated in Fig. 2, the extreme inner ends of the springs are bevelled outwardly, as indicated at 9, to provide wedge-shaped oil spaces which are operative for either direction of rotation of the shaft. Each spring may also be provided with one or more perforations 10 to increase the space for lubricant.

In the form of my invention shown in Fig. 3, the concentric segmental spiral springs 11 are provided, at their outer ends, with outwardly bent lugs 12 which are seated in corresponding perforations in the outer bushing or housing 13. The inner end of each spring is bent inwardly to seat in a suitable depression in a segmental bearing shoe 14 which, in turn, supports the shaft 15. The several bearing shoes 14 are separated by spaces 16 through which lubricant may pass, and, upon rotation of the shaft in either direction, the bearing shoes will tilt slightly to provide the wedge-shaped oil film which has been found so effective in lubricating the shaft.

The methods of operation of all the forms of my invention are similar. As a result of the eccentricity of the shaft, the springs deflect so that the rotor can revolve nearly around its own center. The springs take up all looseness of the bearing, even after considerable wear, and provide liberal tolerances for non-uniformity in shaft diameter. The self-lubricating feature of my invention is important, due to the oil held in the capillary spaces, as hereinabove pointed out. As the springs are deflected, their tension will increase with the deflection so that a larger deflection will give a different critical speed than a smaller one. In addition, the oil in the spaces between the leaves produces a very great damping action, which is effective in preventing resonant vibrations.

It is obvious that my invention has features rendering it desirable for application to large machines as well as to small motors, and I do not intend to limit myself to the application of my bearing to any particular type of machine.

I claim as my invention:

1. A shaft supported by a plurality of superposed spiral springs, the inner ends of the springs engaging the shaft at a plurality of points and the body portions of the springs being internested, with the spiral of one spring fitting between the spirals of other springs.

2. A journal bearing comprising a plurality of internested leaf springs of substantially spiral shape, the leaves of different springs being separated by capillary spaces for holding lubricant.

3. A journal bearing comprising of plurality of concentric segmental spiral springs, the body portions of the springs being internested, with the spiral of one spring fitting between the spirals of other springs, and the inner ends of the springs being tapered to provide a substantially circular bearing portion.

4. A journal bearing comprising a plurality of concentric segmental spiral springs, the inner ends of the springs being tapered to provide a substantially circular bearing portion forming a plurality of wedge-shaped oil spaces between the journal and the several springs.

5. A journal bearing comprising a plurality of concentric segmental spiral springs, the inner ends of the springs being tapered to provide a substantially circular bearing portion forming a plurality of wedge-shaped oil spaces between the journal and the several springs, said wedge-shaped oil spaces being operative for either direction of rotation of the shaft.

6. The combination with an outer bushing, of a journal bearing comprising a plurality of superposed segmental spiral springs having their inner ends supporting the journal and their outer ends seated in said bushing, an intermediate portion of each spring projecting outwardly from a true spiral form to seat in said bushing.

7. The combination with an outer bushing, of a journal bearing comprising a plurality of superposed segmental spiral springs having their inner ends supporting the journal and their outer ends seated in said bushing, an intermediate portion of each spring projecting outwardly from a true spiral form to provide a lug abutting against the outer end of the next adjacent spring.

In testimony whereof, I have hereunto subscribed my name this 3rd day of September, 1924.

WILLIAM E. TRUMPLER.